United States Patent
Mulloth

(10) Patent No.: US 12,510,495 B2
(45) Date of Patent: Dec. 30, 2025

(54) METHOD OF SCANNING A COMPONENT EMBEDDED IN A GRANULAR MATERIAL USING COMPUTED TOMOGRAPHY

(71) Applicant: ROLLS-ROYCE plc, London (GB)

(72) Inventor: Akhil Mulloth, Derby (GB)

(73) Assignee: ROLLS-ROYCE plc, London (GB)

( * ) Notice: Subject to any disclaimer, the term of this patent is extended or adjusted under 35 U.S.C. 154(b) by 169 days.

(21) Appl. No.: 18/524,081

(22) Filed: Nov. 30, 2023

(65) Prior Publication Data
US 2024/0201109 A1  Jun. 20, 2024

(30) Foreign Application Priority Data

Dec. 14, 2022  (GB) ..................................... 2218794

(51) Int. Cl.
*G01N 23/046* (2018.01)
*G01N 23/083* (2018.01)

(52) U.S. Cl.
CPC ......... *G01N 23/046* (2013.01); *G01N 23/083* (2013.01); *G01N 2223/309* (2013.01)

(58) Field of Classification Search
CPC ............... G01N 21/046; G01N 21/083; G01N 2223/309
See application file for complete search history.

(56) References Cited

U.S. PATENT DOCUMENTS

| | | | |
|---|---|---|---|
| 4,601,050 A | 7/1986 | Tanaka | |
| 10,456,101 B2 * | 10/2019 | Wang | G16H 50/50 |
| 2005/0035302 A1 * | 2/2005 | Morrison | H01J 37/20 |
| | | | 250/442.11 |
| 2011/0000494 A1 | 1/2011 | Soung | |
| 2014/0105352 A1 | 4/2014 | Williams | |
| 2017/0304894 A1 * | 10/2017 | Buller | B22F 12/45 |
| 2018/0279906 A1 * | 10/2018 | Sajiki | A61G 13/121 |
| 2018/0281283 A1 * | 10/2018 | Frechman | B29C 64/153 |
| 2019/0234313 A1 * | 8/2019 | Kray | B22F 10/28 |

(Continued)

FOREIGN PATENT DOCUMENTS

| | | | |
|---|---|---|---|
| EP | 0 588 664 A2 | 3/1994 | |
| EP | 2 511 667 A2 | 10/2012 | |
| GB | 1005557 A * | 9/1965 | ........... G01N 23/046 |

(Continued)

OTHER PUBLICATIONS

May 11, 2023 Combined Search and Examination Report issued in British Patent Application No. GB2218794.2.

(Continued)

*Primary Examiner* — Blake C Riddick
(74) *Attorney, Agent, or Firm* — Oliff PLC

(57) ABSTRACT

The present disclosure provides a method of scanning a component by computed tomography, the method comprising: providing the component having a first density; supporting the component in a scanning orientation using a support bed, the support bed comprising a granular material disposed in a container, the granular material having a second density lower than the first density; wherein supporting the component comprises at least partially embedding the component in the granular material. The method further comprises scanning the component in the scanning orientation by X-ray or gamma ray scanning to produce an image of the component.

8 Claims, 8 Drawing Sheets

(56) References Cited

U.S. PATENT DOCUMENTS

2021/0046519 A1* 2/2021 Go .................... B22F 10/68
2021/0190704 A1 6/2021 Bogumil et al.

FOREIGN PATENT DOCUMENTS

JP        S60-181640 A     9/1985
JP        2004-219385 A   8/2004

OTHER PUBLICATIONS

Apr. 15, 2024 Extended European Search Report Issued in European Patent Application No. 23211878.6.
Granton et al., "Implementation of dual- and triple-energy cone-beam micro-CT for postreconstruction material decomposition," Medical Physics, 2008, pp. 5030-5042.

* cited by examiner

METHOD OF SCANNING A COMPONENT EMBEDDED IN A GRANULAR MATERIAL USING COMPUTED TOMOGRAPHY

FIELD OF INVENTION

The present disclosure relates to a method of scanning a component by computed tomography.

BACKGROUND

Computed tomography (CT) scanning is an imaging technique used to obtain detailed images of a component. In particular, CT can be used to produce three-dimensional (3D) representations of a component. This may be useful for performing detailed internal inspection of the component, which may be a component of a turbomachine, such as a gas turbine engine. CT scanning can use X-rays and gamma rays to produce an image of the component. To produce a 3D model, 2D images of the component are taken from multiple angles of the component and the images are computationally combined.

The 3D model is made up of multiple voxels representing cubes in 3D space. Each voxel has a different value on the greyscale based on the opacity of the voxel. For instance, voxels indicating empty space around the component are transparent, while voxels indicating the solid body of the component are opaque. The intensity of opacity is dependent on the material property and the shape of the component.

Typically, a frame or fixture is used to hold the component in a desired orientation and position whilst it is scanned. These fixtures are typically made from a material which has a lower density than the component to be scanned, so that there is a significant difference in the opacity of the voxels of the fixture with respect to the voxels of the component in the 3D model. This enables the component to be easily distinguished from the fixture in the 3D model. These fixtures can be made from foam. However, foam fixtures only offer low strength and have only limited ability to rigidly retain the component in its desired orientation. More robust fixtures can be made using 3D printing or moulding, but have a long manufacturing time, which is undesirable.

There is therefore a need to develop a method of scanning a component which addresses at least some of the aforementioned problems.

SUMMARY

According to an aspect of the present disclosure, there is provided a method of scanning a component by computed tomography, the method comprising: providing the component having a first density; supporting the component in a scanning orientation using a support bed, the support bed comprising a granular material disposed in a container, the granular material having a second density lower than the first density; wherein supporting the component comprises at least partially embedding the component in the granular material. The method further comprises scanning the component in the scanning orientation by X-ray or gamma ray scanning to produce an image of the component.

The component may be separated from the granular material by a barrier disposed between the component and the granular material.

The barrier may have a third density which is lower than the first density.

The barrier may be formed by a casing surrounding the component.

The casing may be vacuum sealed around the component.

The support bed may further comprise a rigid support element disposed in the container. The rigid support element may have a fourth density which is lower than the first density. The rigid support element may be configured to interface with the component to retain the component at a scanning position within the container.

The container may comprise a housing enclosing the granular material. The housing may comprise a flexible wall configured to receive the component. The barrier may be formed by the flexible wall. Supporting the component may comprise positioning the component against the flexible wall to at least partially embed the component in the granular material.

The housing may further comprise a rigid wall. The flexible wall may be attached to the rigid wall.

The support element may comprise a plurality of the containers. Supporting the component may comprise arranging the component between the plurality of containers such that the component is at least partially embedded in the granular material.

The barrier may be transparent.

The granular material may be transparent.

BRIEF DESCRIPTION OF THE DRAWINGS

Embodiments will now be described by way of example only, with reference to the Figures, in which.

DETAILED DESCRIPTION

Figure 1:
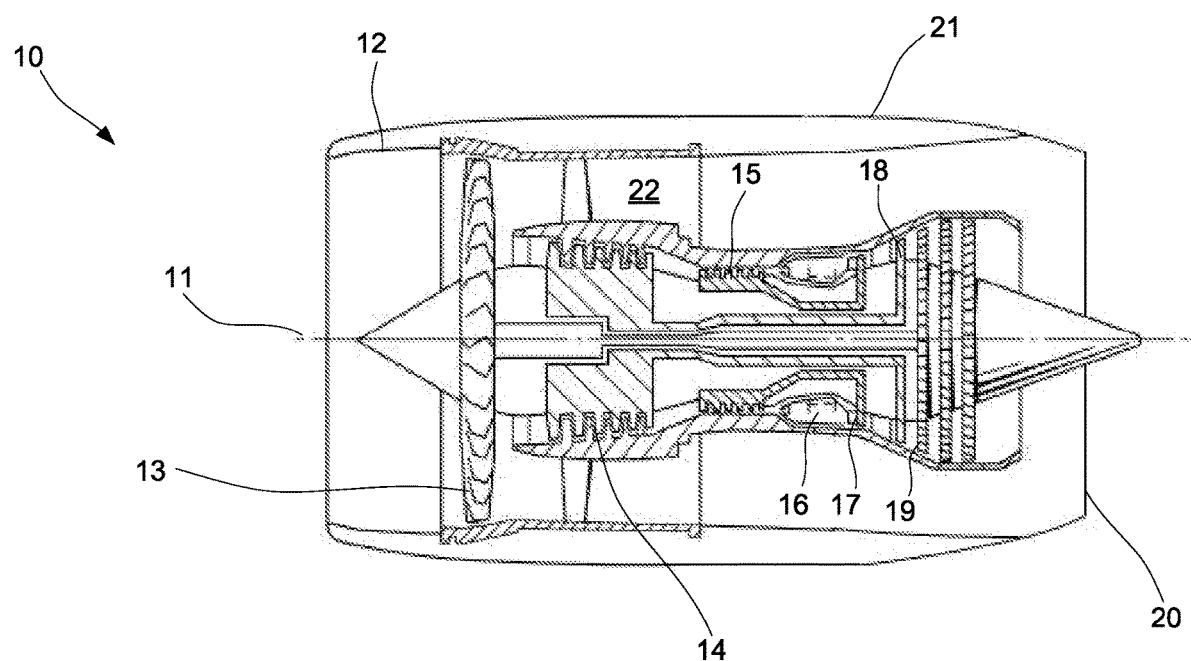
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A component, such as a component of a gas turbine engine, may be scanned using computed tomography (CT) scanning. Here, CT scanning is defined as including scanning by X-rays or gamma rays. The component may be formed from a single material or from multiple materials. The component has an overall first material density. For example, the component may be formed from a metal.

Figure 2:
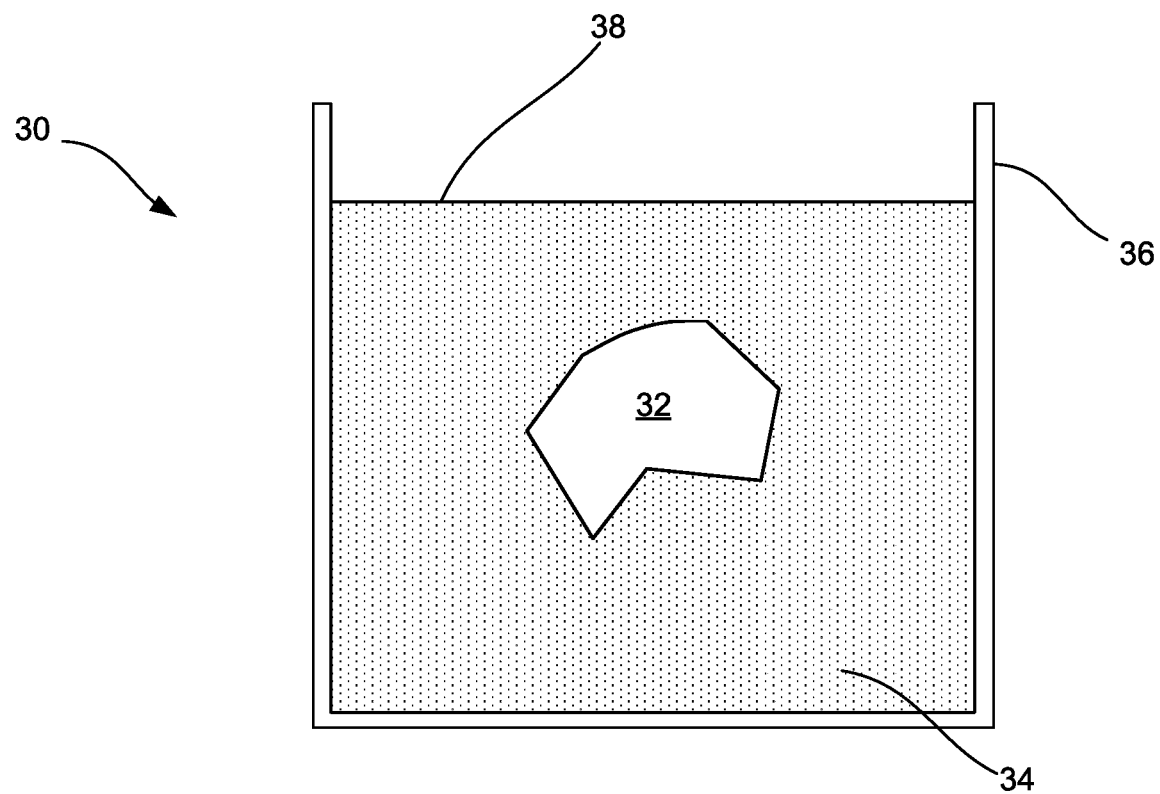
FIG. 2 is a sectional side view of a first example of a support bed according to the present disclosure.

FIG. 2 shows a first example of a support bed 30 according to the present disclosure. The support bed 30 comprises a granular material 34 disposed in a container 36. The granular material 34 comprises a collection of discrete macroscopic particles of one or more materials. The granular material 34 may be a powder. The granular material 34 has an overall second material density, which will be referred to as the second density. By overall density is meant the mean density of the granular material taking into account any spaces between individual grains. The second density is lower than the first density of the component 32. The granular material 34 may be any material that has a lower density than the density of the component 32. For example, if the component 32 is formed from a metal, the granular material 34 may comprise a polymer, glass, foam, etc. In some examples, the granular material 34 may be transparent, which allows the component 32 to be visible when the component 32 is embedded in the granular material 34. The container 36 comprises a lid 38, which prevents the granular material 34 from escaping the container 36. In other examples, the container may not comprise a lid.

In use, the component 32 is placed into the support bed 30 and manipulated within the granular material 34 until the component 32 is in a desired scanning orientation for scanning by X-ray CT. The component 32 is completely embedded within the granular material 34, in that the component 32 is completely surrounded by the granular material 34. In other examples, the component 32 may only be partially embedded in the granular material 34, in that a part of the component 32 is not surrounded by the granular material 34. The granular material 34 is able to support the component 32 in the scanning orientation. An X-ray image of the component 32 is then captured whilst the component 32 is in the scanning orientation. As the second density of the granular material 34 is lower than the first density of the component 32, the granular material 34 attenuates X-rays to a lower extent than the component 32. This means that the component 32 can be readily distinguished from the granular material 34 in the X-ray image. The component 32 can be repositioned within the granular material 34 such that the component 32 is in a different scanning orientation. As the granular material 34 can be readily manipulated, the component 32 can be moved to the different scanning orientation quickly, and the granular material 34 can support and retain the component 32 in the different scanning orientation.

Figure 3:
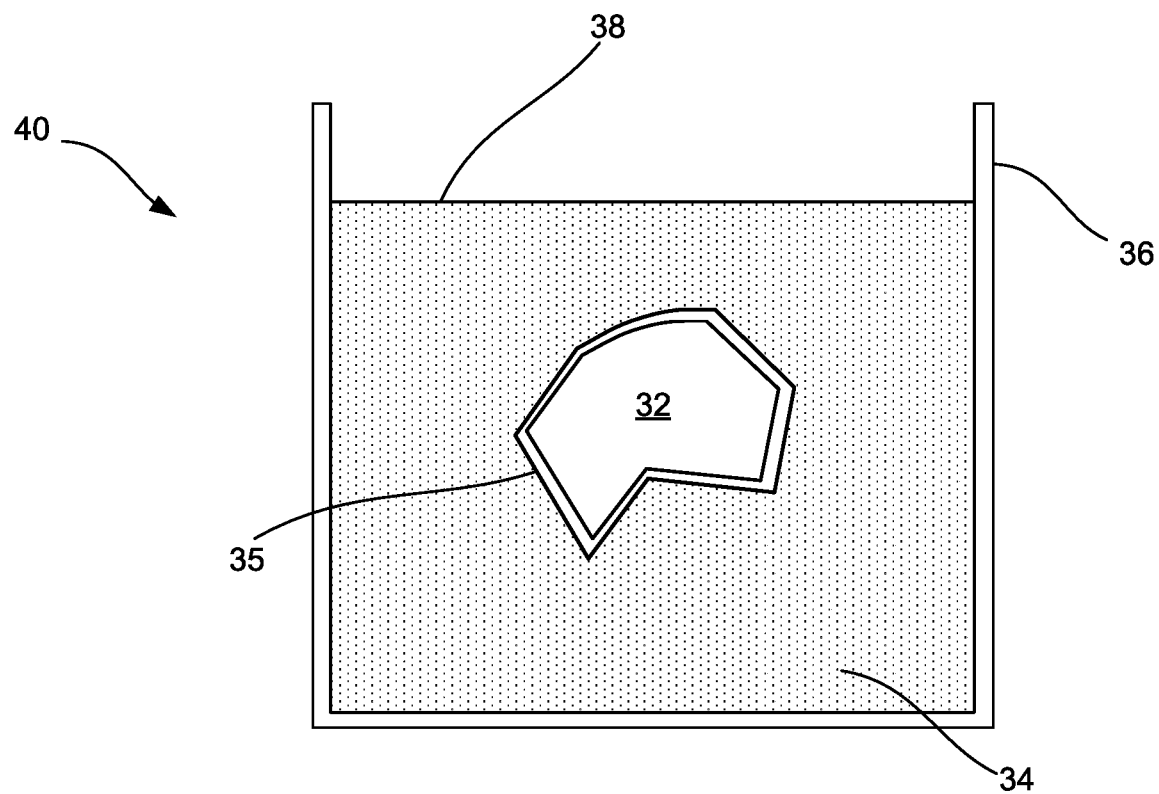
FIG. 3 is a sectional side view of a second example of a support bed according to the present disclosure.

FIG. 3 shows a second example of a support bed according to the present disclosure. The second example is substantially similar to the first example, with like reference numerals denoting like features. The second example differs from the first example only with respect to a casing covering the component.

The component 32 is covered by a casing 35. The casing 35 has a third material density. The third density is lower than the first density of the component 32. The third density may be the same as or different to the second density of the granular material 34. The casing 35 may be vacuum sealed to the component 32, forming a tight cover around the component 32. Alternatively, the casing 35 may be loosely secured around the component 32. The casing 35 forms a barrier between the component 32 and the granular material 34 such that the component 32 is prevented from contacting the granular material 34. The casing 35 may be transparent or opaque, with the transparent casing enabling the component 32 to be visible when it is covered by the casing 35.

In use, the second example support bed 40 functions in a similar manner to the first example. The component 32 is placed into the support bed 40 and manipulated within the granular material 34 until the component 32 is in a desired scanning orientation for scanning by X-ray CT. The component 32 is completely embedded within the granular material 34, in that the component 32 is completely surrounded by the granular material 34. In other examples, the component 32 may only be partially embedded in the granular material 34, in that a part of the component 32 is not surrounded by the granular material 34. The granular material 34 is able to support the component 32 in the scanning orientation. An X-ray image of the component 32 is then captured whilst the component 32 is in the scanning orientation. As the second density of the granular material 34 and the third density of the casing 35 is lower than the first density of the component 32, the granular material 34 and the casing 35 attenuates X-rays to a lower extent than the component 32. This means that the component 32 can be readily distinguished from the granular material 34 and the casing 35 in the X-ray image. The component 32 can be repositioned within the granular material 34 such that the component 32 is in a different scanning orientation. As the granular material 34 can be readily manipulated, the component 32 can be moved to the different scanning orientation quickly, and the granular material 34 can support and retain the component 32 in the different scanning orientation.

Figure 4:
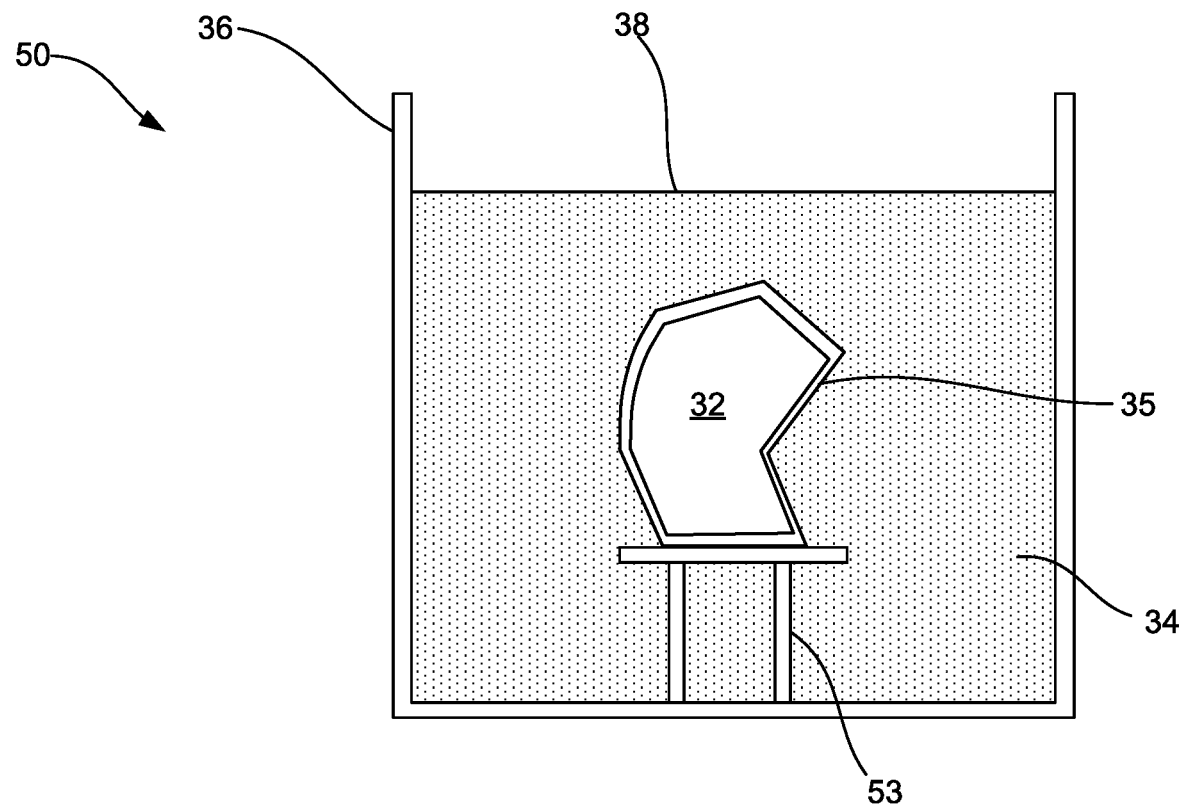
FIG. 4 is a sectional side view of a third example of a support bed according to the present disclosure.

FIG. 4 shows a third example of a support bed according to the present disclosure. The third example is substantially similar to the second example, with like reference numerals denoting like features. The third example differs from the second example only with respect to the presence of an additional support element.

The support bed 50 comprises a rigid support element 53 disposed in the container 36. The support element 53 is formed as a mesh frame which rests on the base of the container 36. The support element 53 is formed from a rigid material. The support element 53 has a fourth material density which is lower than the first density of the component 32. The fourth density may the same as or different to the second density of the granular material 34 or the third density of the casing 35. The support element 53 is configured to provide additional support for the component 32 in the container 36 and retain the component 32 at a particular location within the container 36. In this example, the support element 53 enables the component 32 to be in a raised position above the base of the container 36. In other examples, the support element may extend from other walls of the container 36; for example, a ledge may extend from a side wall of the container 36. In further examples, a plurality of support elements may be provided. The support element may also comprise one or more retaining features (e.g., clips or clamps) which help to retain the component 32 in a particular location in the container 36.

In use, the third example support bed 50 functions in a similar manner to the second example. In addition, the rigid support element 53 provides a base on which the component 32 can be placed while it is manipulated within the granular material 34 to the desired scanning orientation. An X-ray image of the component 32 is then captured whilst the component 32 is in the scanning orientation. As the second density of the granular material 34, the third density of the casing 35, and the fourth density of the support element 53 is lower than the first density of the component 32, the granular material 34, the casing 35, and the support element 53 attenuate X-rays to a lower extent than the component 32. This means that the component 32 can be readily distinguished from the granular material 34, the casing 35, and the support element 53 in the X-ray image. The component 32 can be repositioned within the granular material 34 such that the component 32 is in a different scanning orientation. As the granular material 34 can be readily manipulated, the component 32 can be moved to the different scanning orientation quickly, and the granular material 34 and the support element 53 can support and retain the component 32 in the different scanning orientation.

In other examples, the support bed may have a rigid support element, but there may not be a casing covering the component. The component may then directly contact the granular material and the rigid support element in the support bed.

Figure 5:
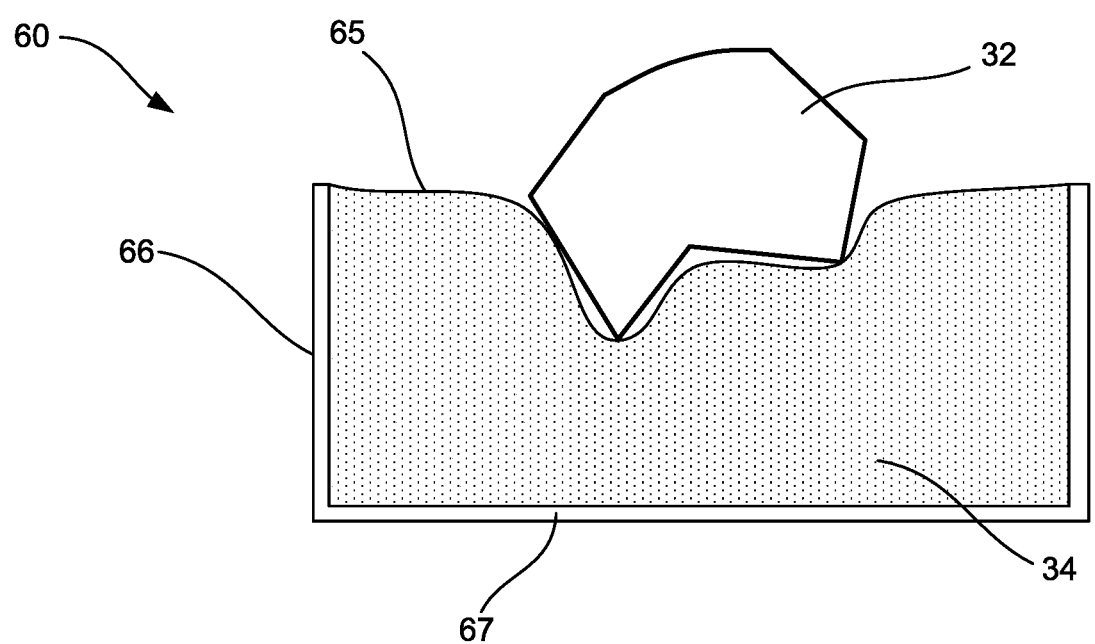
FIG. 5 is a sectional side view of a fourth example of a support bed according to the present disclosure.

FIG. 5 shows a fourth example of a support bed according to the present disclosure. The fourth example support bed comprises similar features to the first example and the second example, with like reference numerals denoting like features.

The support bed 60 comprises a granular material 34 disposed in a container 66. The container 66 comprises a housing 67 having rigid base and side walls. The housing 67 also comprises a top wall 65 which is a flexible wall. The top wall 65 is attached to the side walls of the housing 67. The housing 67 therefore encloses the granular material 34. The flexible wall 65 covers the granular material 34 and is configured to be manipulated, such that the flexible wall 65 can be pushed into the granular material 34 and cause the granular material 34 to move within the container 66. The flexible wall 65 may be configured to be manipulated against the granular material because the flexible wall 65 is not attached in a taut manner to the side walls, which provides sufficient slack in the flexible wall 65 to enable it to be manipulated. Additionally, or alternatively, the housing 67 may not be completely filled by the granular material 34, which provides space for the flexible wall 65 to be manipulated against the granular material 34.

The component 32 does not have a casing covering the component 32. Instead, the flexible wall 65 forms the barrier between the component 32 and the granular material 34, in that the flexible wall 65 prevents the component 32 from contacting the granular material 34. The flexible wall 65 may be formed from a material which has a third density lower than the first density of the component 32. In some examples, the granular material 34 and the flexible wall 65 may be transparent, which allows the component 32 to be visible when the component 32 is embedded in the granular material.

In use, the component 32 is manipulated against the flexible wall 65, which causes the granular material 34 to move, such that the component 32 is in a desired scanning orientation and is partially embedded in the granular material 34. By being partially embedded, the component 32 is at least partially surrounded by the granular material 34. The granular material 34 is therefore able to support the component 32 such that it remains in its scanning orientation. An X-ray image of the component 32 is then captured whilst the component 32 is in the scanning orientation. As the second density of the granular material 34 and the third density of the flexible wall 65 is lower than the first density of the component 32, the granular material 34 and the flexible wall 65 attenuate X-rays to a lower extent than the component 32. This means that the component 32 can be readily distinguished from the granular material 34 and the flexible wall 65 in the X-ray image. The component 32 can be repositioned against the flexible wall 65 such that the component 32 is in a different scanning orientation. As the flexible wall 65 and the granular material 34 can be readily manipulated, the component 32 can be moved to the different scanning orientation quickly, and the granular material 34 can support and retain the component 32 in the different scanning orientation.

Figure 6:
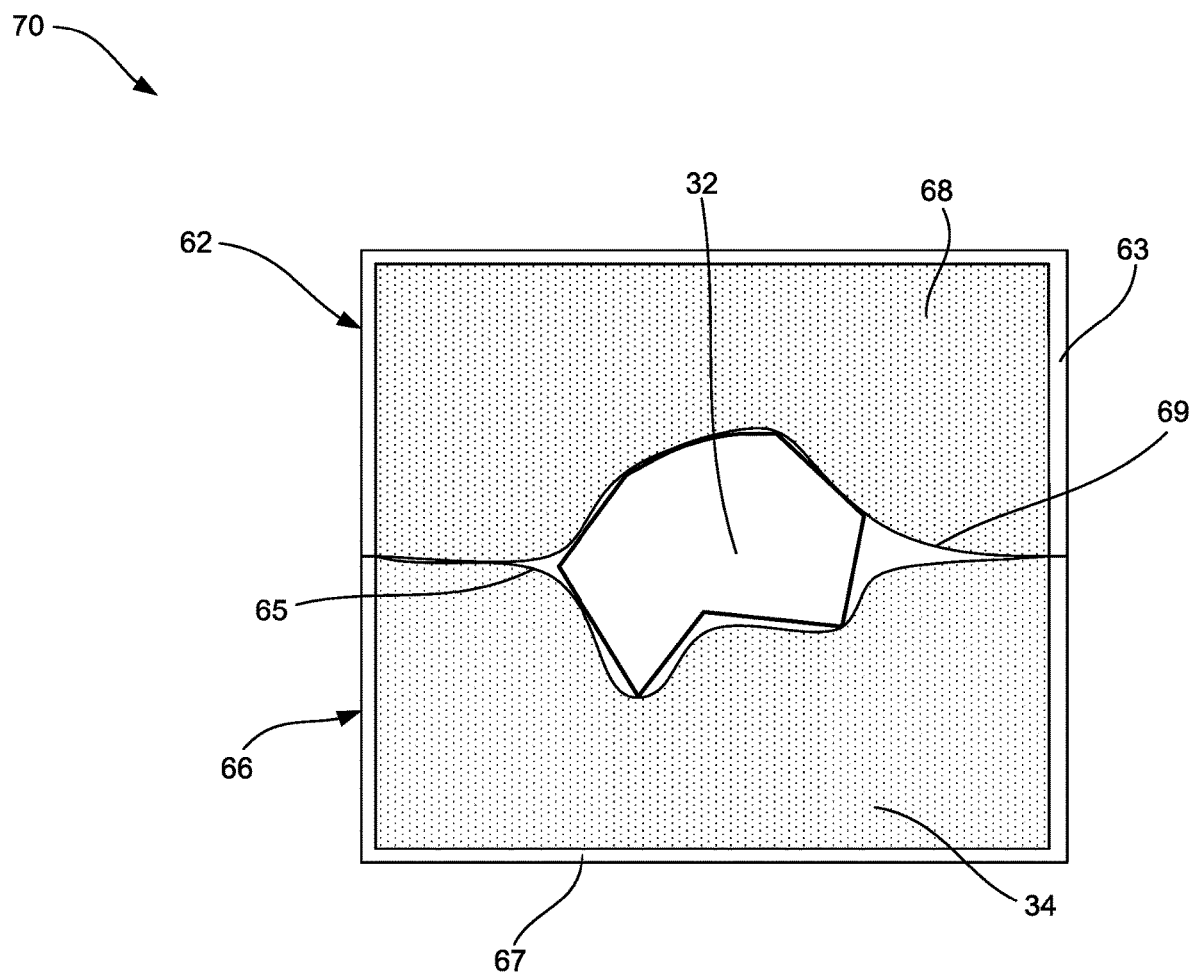
FIG. 6 is a sectional side view of a fifth example of a support bed according to the present disclosure.

FIG. 6 shows a fifth example of a support bed according to the present disclosure. The fifth example support bed is similar to the fourth example support bed, with like reference numerals denoting like features. The fifth example support bed further comprises a second container.

The fifth example support bed 70 comprises a first container 66 and a second container 62. The first container 66 is substantially similar to the container 66 shown in the fourth example support bed 60. The second container 62 is substantially similar to the first container 66. and comprises a granular material 64 disposed within the container 62. The second container 62 comprises a housing 63 having rigid top and side walls. The housing 63 also comprises a bottom wall 69 which is a flexible wall, which is arranged in a substantially similar manner to the flexible wall 65 of the first container 66. The flexible wall 65, 69 of each of the first and second containers 66, 62 is configured to be manipulated against the granular material 34, 68 and cause the granular material 34, 68 to move within the respective container 66, 62.

The second container 62 can be considered to be a copy of the first container 66 which is turned upside-down and placed on top of the first container 66, such that the side walls of the first container 66 abut against the side walls of the second container 62. Thus, in use, the component 32 is manipulated against the flexible wall 65 of the first container 66, which causes the granular material 34 in the first container 66 to move, such that the component 32 is in a desired scanning orientation and is partially embedded in the granular material 34. The second container 62 is then placed over the component 32 and the first container 66 such that the side walls of the first container 66 abut against the side walls of the second container 62. The flexible wall 69 of the second container 62 will lie against the outer surface of the component, due to the weight of the granular material 68 within the second container 62. The component 32 is partially surrounded by the granular material 68 in the second container 62. The component 32 is completely surrounded by and embedded within the granular material 34, 68 of the first and second containers 66, 62 together. The second container 62 provides additional support for retaining the component 32 in the scanning orientation. An X-ray image of the component 32 is then captured whilst the component 32 is in the scanning orientation. As the density of the granular material 34, 68 and the density of the flexible walls 65, 69 is lower than the first density of the component 32, the granular material 64, 68 and the flexible walls 65, 69 attenuate X-rays to a lower extent than the component 32. This means that the component 32 can be readily distinguished from the granular material 64, 68 and the flexible walls 65, 69 in the X-ray image. The component 32 can be repositioned with respect to the first and second containers 66, 62 such that the component 32 is in a different scanning orientation. As the flexible walls 65, 69 and the granular material 64, 68 can be readily manipulated, the component 32 can be moved to the different scanning orientation quickly, and the granular material 64, 68 can support and retain the component 32 in the different scanning orientation.

In other examples, the support bed 70 may comprise more than two such containers which can be arranged together to support the component.

Figure 7:
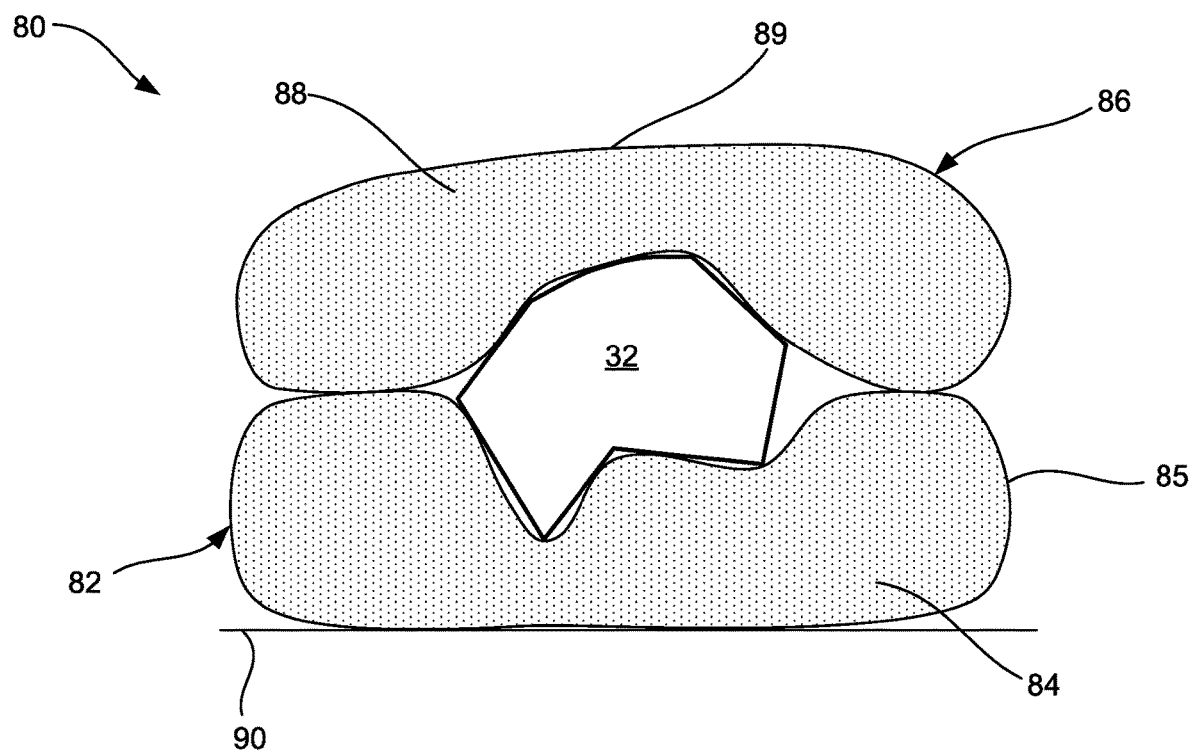
FIG. 7 is a sectional side view of a sixth example of a support bed according to the present disclosure.

FIG. 7 shows a sixth example of a support bed according to the present disclosure. The sixth example support bed comprises similar features to the first, second, third, fourth, and fifth examples, with like reference numerals denoting like features.

The sixth example support bed 80 comprises a first container 82 and a second container 86. The first container 82 comprises a granular material 84 encased by a flexible housing 85. The second container 66 also comprises a granular material 88 encased by a flexible housing 89. The flexible housing 85, 89 of each of the first and second containers 82, 86 surrounds the respective granular material 84, 88 to form a sealed bag around the granular material 84, 88, for example in the manner of a bean bag. The flexible housing 85, 89 may be formed from any flexible material that is readily pliable into different shapes, for example a fabric or polymer-based material. The flexible housing 85, 89 is therefore configured to be manipulated, such that the flexible housing 85, 89 can be pushed against the respective granular material 84, 88 and cause the granular material 84, 88 to move within the respective container 82, 86. The flexible housing 85, 89 of the first and second containers 82, 86 therefore forms a barrier between the respective granular material 84, 88 and the component 32, preventing the granular material 84, 88 from contacting the component 32. The flexible housing 85, 89 may be formed from any material which has a lower density than the first density of the component 32. In some examples, the granular material 84, 88 and the flexible housing 85, 89 may be transparent, which allows the component 32 to be visible when the component 32 is embedded in the granular material 84, 88.

The granular material 84, 86 of the first and second containers 82, 86 may be in a powdered form. The granular material 84, 86 of the first and second containers 82, 86 may be the same or may be different; however, they both have an overall density which is lower than the first material density of the component 32. The granular material 84, 86 of the first and second containers 82, 86 may therefore be any material that has a lower density than the density of the component 32.

In use, the first container 82 is placed on a surface 90. The surface 90 may be substantially flat. The component 32 is then manipulated and positioned against the flexible housing 85 of the first container 82, causing the granular material 84 to move within the first container 82. The component 32 is positioned such that it is in a desired scanning orientation and is partially embedded in the granular material 84. By being partially embedded, the component 32 is at least partially surrounded by the granular material 84. The granular material 84 in the first container 82 is therefore able to support the component 32 such that it remains in its scanning orientation. The second container 86 is then placed over the component 32 and the first container 82. The second container 86 is manipulated with respect to the component 32 such that the flexible housing 89 of the second container 86 lies against the outer surface of the component 32. The component 32 is therefore positioned between the first container 82 and the second container 86. The component 32 is partially surrounded by the granular material 88 in the second container 86. The component 32 is completely surrounded by and embedded within the granular material 84, 88 of the first and second containers 82, 86 together. The second container 86 provides additional support for retaining the component 32 in the scanning orientation. An X-ray image of the component 32 is then captured whilst the component 32 is in the scanning orientation. As the density of the granular material 84, 88 and the density of the flexible housings 85, 89 is lower than the first density of the component 32, the granular material 84, 88 and the flexible housings 85, 89 attenuate X-rays to a lower extent than the component 32. This means that the component 32 can be readily distinguished from the granular material 84, 88 and the flexible housings 85, 89 in the X-ray image. The component 32 can be repositioned with respect to the first and second containers 82, 86 such that the component 32 is in a different scanning orientation. As the flexible housings 85, 89 and the granular material 84, 88 can be readily manipulated, the component 32 can be moved to the different scanning orientation quickly, and the granular material 84, 88 can support and retain the component 32 in the different scanning orientation.

In other examples, the support bed 80 may only comprise a single container with a flexible housing similar to the first and second containers described above. In further examples, the support bed 80 may comprise more than two such containers which can be arranged together to support the component therebetween.

Figure 8:
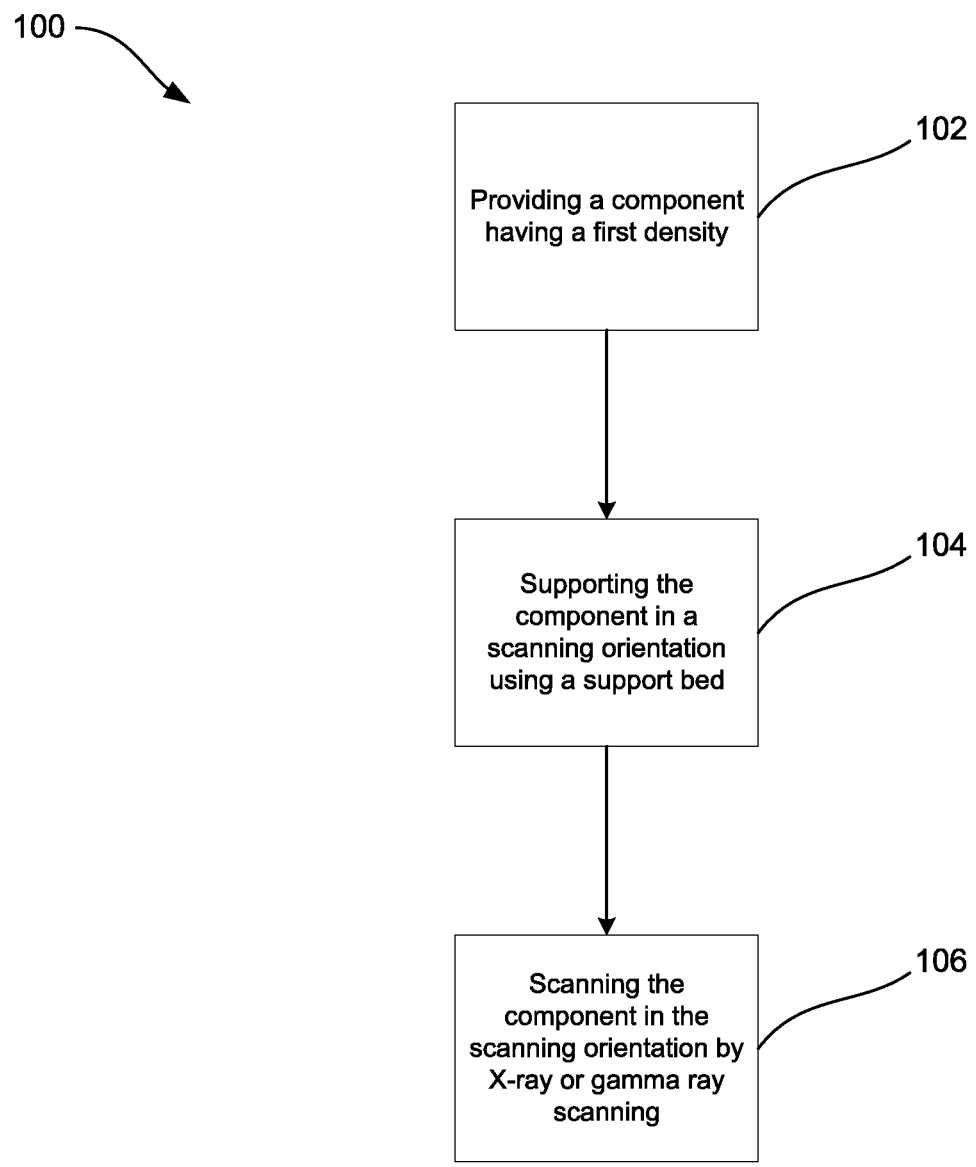
FIG. 8 is a flow diagram illustrating a method of scanning a component by x-ray CT according to the present disclosure.

FIG. 8 is a flow diagram showing a method 100 of scanning a component by computed tomography according to the present disclosure. In a first step 102, the method comprises providing the component having a first density. In a second step 104, the method comprises supporting the component in a scanning orientation using a support bed. The support bed comprises a granular material disposed in a container, the granular material having a second density lower than the first density. Supporting the component comprises at least partially embedding the component in the granular material. The component is separated from the granular material by a barrier disposed between the component and the granular material. In a third step 106, the method comprises scanning the component in the scanning orientation by X-ray or gamma ray scanning to produce an image of the component.

The method of the present disclosure provides an improved method of scanning a component by CT scanning by improving the way in which the component is supported and held in a desired orientation whilst it is scanned. The support bed comprising a granular material disposed in a container provides a fixture for the component which is completely reconfigurable and can support the component in infinitely variable orientations, without requiring a new fixture to be produced for each desired scanning orientation.

A single support bed can be used for a multitude of different components and geometries as the granular material can quickly adapt to the different geometries. The support bed is therefore reusable, reducing material waste. The component can be moved between different orientations in a matter of seconds by manipulating it with respect to the granular material. As the density of the granular material is lower than the density of the component, the component can be readily distinguished in the scanned images and the component can be easily inspected. The barrier between the component and the granular material prevents the granular material from contacting the component and prevents the granular material from entering any cavities or crevices of a complex component, which might otherwise reduce the clarity of the image. By providing a flexible wall for the container which acts as the barrier, the component itself does not need to be covered, and the flexible wall and the granular material can robustly support the component, whilst preventing contact between the component and the granular material.

Although it has been described in the above examples that the component is scanned in the scanning orientation by X-rays to produce an image, it will be appreciated that in other examples gamma rays can be used to scan the component and produce an image.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of scanning a component by computed tomography, the method comprising:
    providing the component having a first density;
    supporting the component in a scanning orientation using a support bed, the support bed comprising a granular material disposed in a container, the granular material having a second density lower than the first density;
        wherein supporting the component comprises at least partially embedding the component in the granular material; and
    scanning the component in the scanning orientation by X-ray or gamma ray scanning to produce an image of the component, wherein:
        the support bed further comprises a rigid support element disposed in the container, the rigid support element having a fourth density which is lower than the first density,
        the rigid support element is configured to interface with the component to retain the component at a scanning position within the container, and
        a barrier is in contact with the support element and the barrier completely surrounds the component such that the component is separated from the granular material by the barrier disposed between the component and the granular material.

2. A method as claimed in claim 1, wherein the barrier has a third density which is lower than the first density.

3. A method as claimed in claim 1, wherein the barrier is formed by a casing surrounding the component.

4. A method as claimed in claim 3, wherein the casing is vacuum sealed around the component.

5. A method as claimed in claim 1, wherein the barrier is transparent.

6. A method as claimed in claim 1, wherein the granular material is transparent.

7. A method of scanning a component by computed tomography, the method comprising:
    providing the component having a first density;
    supporting the component in a scanning orientation using a support bed, the support bed comprising a granular material disposed in a container, the granular material having a second density lower than the first density;
        wherein supporting the component comprises at least partially embedding the component in the granular material; and
    scanning the component in the scanning orientation by X-ray or gamma ray scanning to produce an image of the component, wherein:
        the component is separated from the granular material by a barrier disposed between the component and the granular material
        the container comprises a housing enclosing the granular material, the housing comprising a flexible wall configured to receive the component,
        the barrier is formed by the flexible wall,
        supporting the component comprises positioning the component against the flexible wall to at least partially embed the component in the granular material,
        the housing further comprises a rigid wall,
        the flexible wall is attached to the rigid wall, and
        the flexible wall and the rigid wall together define an interior space that contains the granular material.

8. A method of scanning a component by computed tomography, the method comprising:
    providing the component having a first density;
    supporting the component in a scanning orientation using a support bed, the support bed comprising:
        a first container comprising a first housing enclosing a first granular material, the first housing comprising a first flexible wall and a first rigid wall that together define a first interior space that contains the first granular material, and the first flexible wall forming a first barrier between the first granular material and the component, and
        a second container comprising a second housing enclosing a second granular material, the second housing comprising a second flexible wall and a second rigid wall that together define a second interior space that contains the second granular material, and the second flexible wall forming a second barrier between the second granular material and the component, wherein:
            supporting the component comprises placing the component between the first flexible wall and the second flexible wall, and
            both of the first granular material and the second granular material have a second density lower than the first density; and
    scanning the component in the scanning orientation by X-ray or gamma ray scanning to produce an image of the component.

* * * * *